INVENTOR.
Keith Kennedy
BY Louis Chayka
Attorney

United States Patent Office 3,026,916
Patented Mar. 27, 1962

3,026,916
MECHANISM TO CONTROL INFLATION OF TIRES
Keith Kennedy, 5295 Middlebelt Road, Rte. 2, Orchard Lake, Mich.
Filed Dec. 21, 1959, Ser. No. 860,775
3 Claims. (Cl. 141—197)

The invention pertains to means and manner of inflating large tires of the type used for tractors, farm machinery, military vehicles for heavy loads, and other vehicles, in each of which cases the inflation of the respective tires to the desired pressure of air therein requires considerable time and attention of the person in control of said inflation, and may call for repeated stoppages in the course of said inflation. The stoppages are necessary in order to ascertain whether the pressure in a tire has reached a desired limit or that said pressure has not been raised in the tire beyond the limit of safety.

It is, therefore, the object of this invention to provide means permitting a tire to be inflated to a desired level of air pressure therein without the need of constant personal attention thereto, and within a fraction of the time required under the present practice. The means include controls for automatic stoppage of the inflation of a tire once the pressure within the tire has reached the desired limit.

In order to carry out this object, consideration is given to the capacity of the tire, that is the size of the tire as gauged by the volume or the internal inflatable space therein, the operative pressure of the air admitted to the tire, and the approximate time needed for the purpose, as determined by previous experimentation.

Because the inflation of the tire as guided by said considerations may still result in inflation falling short in pounds of pressure below the desired limit, the mechanism includes means of automatically checking the pressure of the tire at the end of a predetermined period, whereupon, if the pressure is too low, the inflation will be continued automatically for one or more short periods to bring said pressure up to the desired limit.

The mechanism employed for achievement of the purpose specified above consists of a plurality of devices, all of which are well known in trade but which are connected in a combination which is new and capable of producing a new result as described above.

Figure 1:
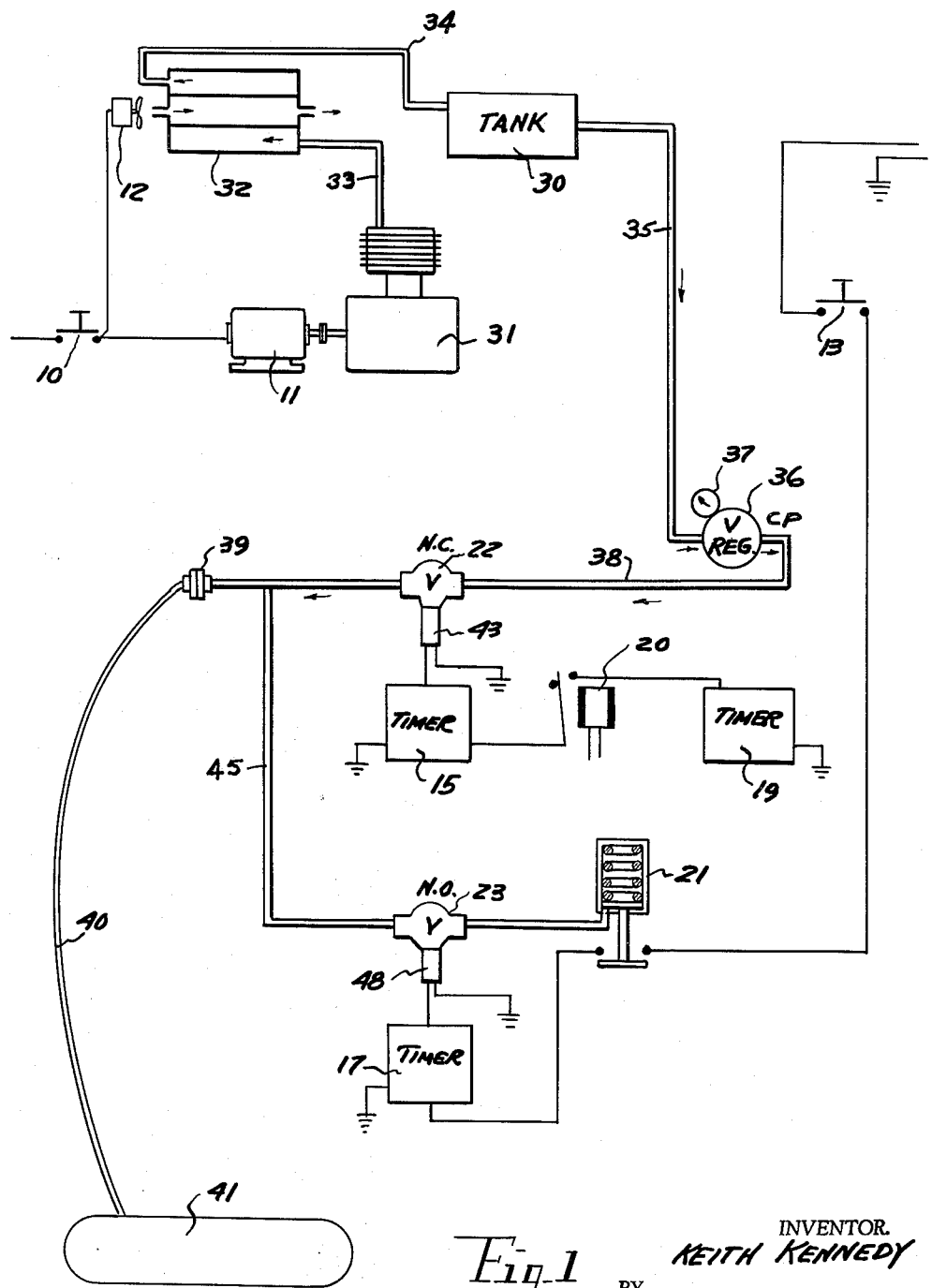
Figure 2:
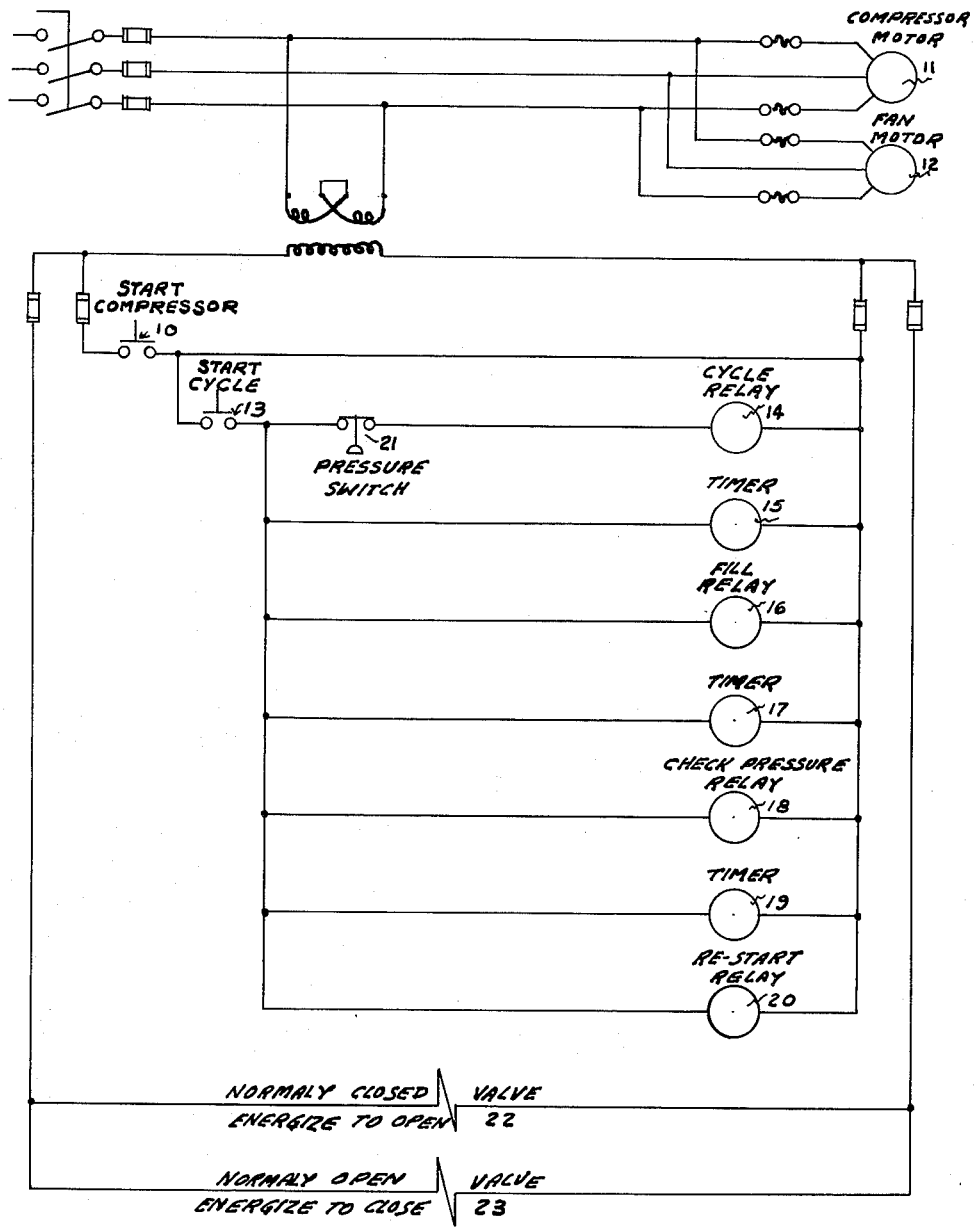

I shall now describe my invention with reference to the accompanying drawings in which:

FIG. 1 presents a diagrammatic scheme of the combination of said devices;

FIG. 2 shows a diagram of an electric circuit for the operation of said device.

Included in said combination is a tank 30 for compressed air to be held therein. Numeral 31 indicates a compressor which is connected to a heat exchanger 32 by means of a pipe 33, while, in turn, the heat exchanger is connected by means of a pipe 34 to said tank 30.

Extending from the tank is a pipe 35 which leads to a pressure regulator 36, the latter being adapted to be set manually to a desirable pressure at which air from the tank is to be admitted into a tire to be inflated. Numeral 37 indicates a gauge disclosing the operative pressure as set by said regulator. A pipe 38, leading from said regulator, is provided with a coupling 39, and connected thereto is one end of a flexible hose 40. The other end of the hose is adapted to be connected to a tire 41, which tire is to be inflated. Between the regulator 36 and the coupling 39, the pipe 38 is provided with a valve 22. The valve is actuated by a solenoid, marked 43, said solenoid being controlled by an electric timer 15.

Branching off the pipe 38, at a point between the coupling 39 and the valve 22, is a pipe 45 which leads to an electric switch 21. The latter is responsive to air pressure when said pressure has reached a predetermined level.

The above-named pipe 45 is provided with a single valve 23 for operation by a solenoid 48 which is controlled by a timer 17, called the second timer, while the last timer is operatively connected to another timer 19, called the third timer. These two timers are adapted to be run in sequence, as will be presently explained.

As already intimated herein, the timers are driven by an electric current in a circuit disclosed in FIG. 2, in which circuit each timer, excepting timer 19, is operatively connected to a separate solenoid which, in turn, actuates a valve. In further explanation of the operative relation between the elements shown in the above description, I wish to say that the valve 22 is normally closed and said valve 23 in the pipe 45 branching off from the main pipe line 38 is normally open.

The circuit, including the valves and the timers, is shown in FIG. 2. As the symbols for some of the operative devices in said circuit are not furnished in the table of symbols in the Rules of Practice of the Patent Office, said devices have been identified by symbols acceptable in electrical engineering.

Disclosed in FIG. 2 is a manual switch, marked 10, which will start the motor of the compressor 11 and a fan 12. Numeral 13 indicates a switch in the circuit operating timers and valves in the main circuit and the secondary circuits controlled by relays, as shown in the diagram. Other elements disclosed in the circuit are identified in the course of the specification by numerals shown in said FIG. 2.

While the circuit shows only one timer 15 and one valve 22, it is desirable for reasons of safety to employ two valves 22 and two timers 15 in the practical application of the invention described herein. The object is to keep the apparatus in operation even if one of the timers should fail.

The combination of elements described herein and forming a compact apparatus works as follows:

First, the regulator 36 is set to the desired operative air pressure which, preferably, may range from 350 to 500 pounds. Next, each of the timers 15 is set to operate for a selected period of time, such as fifteen seconds, during which time the air is to be admitted into the tire to be inflated. The two timers 17 and 19 are each set to run for a short period of two or three seconds, but are to operate in sequence. The first of said timers, namely, timer 17, is, as already indicated, operatively connected to the solenoid valve 23 in the pipe 45 which leads to the pressure switch 21. Assuming now that the hose 40 has been connected to the tire which is to be inflated, the circuit, including said timers, valves, and the compressor, may be closed manually by means of the switch 13. As a result, the respective solenoids will open valve 22 and close valve 23.

During the length of said period, air, under pressure, will pass from the tank through the valves 22 into the tire. At the end of said period, the timer 15 will close said valve, whereupon timer 17, brought into the circuit by means of relay 16, will run for a short period, such as two seconds, while the valve 23 in the pipe 45 leading to the pressure switch 21 remains closed. During this short period, the pressure within the tire and within the pipe 45 will become equalized. At the end of said short period, the timer 17 will energize the solenoid of valve 23, opening said valve and thus permitting passage of air to said pressure switch 21. Simultaneously, as the valve 23 is opened by the relay 14, the second timer 19 begins to run for another short period of about two seconds, during which time, if the pressure of air has reached a predetermined level of pressure, the switch 21, responding to said pressure, will break the circuit to bring the operation of the apparatus to a stop. In case, however, the pressure is not high enough to actuate said pressure switch, the timer 19 will, by means of a relay 20, restart the operation of the apparatus from the beginning through all the steps described above till the operation will be stopped by means of said pressure switch 21, as stated above.

It will be understood that some changes may be made in the relation of parts to each other and in the circuit controlling the function of said parts without departing beyond the inventive concept disclosed herein.

After having described my invention, what I wish to claim is as follows:

1. In combination, a source of air under pressure, a first pipe leading therefrom for attachment to a tire to be inflated, a first solenoid valve in said pipe, a first timer therefor, an electrical circuit including said timer and solenoid valve, the timer being adapted to close said circuit to keep the valve open for a predetermined period of time, a second pipe connected to the first pipe at a point between the first valve and the tire, a second solenoid valve in said second pipe, a second timer connected thereto, said second solenoid valve and second timer being connected in said circuit, said second timer adapted to close said circuit to keep second valve open for a predetermined period of time, both valves and both timers being included in said electrical circuit adapted to successively operate said timers and said valves respectively, a starting switch connected in said circuit to close said circuit to actuate said timers and said valves, a pressure switch at the end of said second pipe, said switch being responsive to predetermined air pressure to break said circuit, a third timer operatively connected to the second timer, a second circuit including said first and third timers, the first timer being adapted to keep the first valve open while the second valve is closed, the second timer being adapted to open the second valve after a lapsed predetermined time upon the closure of the first valve to allow passage of air to the pressure switch, and to energize the third timer to close the secondary circuit to reactivate the first timer and valve on failure of the pressure switch to break the circuit.

2. In combination, a tank holding air under pressure, a pipe leading therefrom for attachment to a hose to be connected to a tire to be inflated, a first valve in said pipe, a solenoid to operate said valve, the valve being normally closed, a timer in an electrical circuit including said solenoid and a manual switch, the timer being adapted to close said circuit energizing said solenoid for a selected period of time, a branch pipe connected to the first named pipe at a point between said valve and the tire, a switch at the end of said branch pipe responsive to pressure of air to break said circuit when said pressure has reached a predetermined limit, a second valve in said branch pipe between said switch and the connection to the first named pipe, a solenoid to operate said second valve, a second timer in said circuit operatively connected to the solenoid of the second valve, a second circuit including said first timer, and a third timer in said second circuit operatively associated with the second timer and adapted to energize the second circuit for a limited period after the second timer is deenergized, said third timer being adapted to close the second circuit energizing the first mentioned solenoid to reopen the first valve and to close the second valve.

3. A combination of elements as defined in claim 1, but including a pair of valves in the first named pipe, each valve being associated with and controlled by a separate timer, the timers being synchronized, but each of them adapted to act independently of the other.

References Cited in the file of this patent

UNITED STATES PATENTS

| 2,691,475 | Jordan | Oct. 12, 1954 |
| 2,695,122 | Learman | Nov. 23, 1954 |
| 2,818,081 | Eichnauer | Dec. 31, 1957 |